(12) United States Patent
Anderson et al.

(10) Patent No.: US 9,628,947 B2
(45) Date of Patent: Apr. 18, 2017

(54) WEARABLE MAP AND IMAGE DISPLAY

(71) Applicant: Intel Corporation, Santa Clara, CA (US)

(72) Inventors: Glen J. Anderson, Beaverton, OR (US); Francisco Javier Fernandez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/368,387

(22) PCT Filed: Dec. 4, 2013

(86) PCT No.: PCT/US2013/073155
§ 371 (c)(1),
(2) Date: Jun. 24, 2014

(87) PCT Pub. No.: WO2015/084346
PCT Pub. Date: Jun. 11, 2015

(65) Prior Publication Data
US 2015/0154769 A1    Jun. 4, 2015

(51) Int. Cl.
*G06F 3/0481*    (2013.01)
*G06F 1/16*     (2006.01)
*G06F 3/0482*    (2013.01)
*H04N 1/00*     (2006.01)
*H04W 4/02*     (2009.01)
*G04G 21/08*    (2010.01)

(52) U.S. Cl.
CPC ........... *H04W 4/02* (2013.01); *G04G 21/08* (2013.01); *G06F 1/163* (2013.01); *G06F 3/0481* (2013.01); *G06F 3/0482* (2013.01); *H04N 1/00164* (2013.01)

(58) Field of Classification Search
None
See application file for complete search history.

(56) References Cited

U.S. PATENT DOCUMENTS

2006/0209218 A1   9/2006   Lee et al.
2009/0251888 A1   10/2009  Douglas
(Continued)

FOREIGN PATENT DOCUMENTS

CN    105683900 A       6/2016
WO    WO-2010011903 A2  1/2010
WO    WO-2015084346 A1  6/2015

OTHER PUBLICATIONS

"International Application Serial No. PCT/US2013/073155, International Preliminary Report on Patentability mailed Jun. 16, 2016", 12 pgs.

(Continued)

*Primary Examiner* — Matthew Salvucci
(74) *Attorney, Agent, or Firm* — Schwegman Lundberg & Woessner, P.A.

(57) ABSTRACT

Embodiments of a wearable electronic device having mapping and imaging functions are disclosed. The wearable electronic device may have a controller coupled to an annular touchscreen display and a plurality of sensors. The controller may be configured to execute mapping and imaging functions such that the results of those functions may be displayed on the touchscreen display relative to a user of the wearable electronic device.

23 Claims, 8 Drawing Sheets

(56) References Cited

U.S. PATENT DOCUMENTS

| | | |
|---|---|---|
| 2012/0055963 A1 | 3/2012 | Phair |
| 2012/0062445 A1 | 3/2012 | Haddick et al. |
| 2013/0178753 A1* | 7/2013 | Wu .................... A61B 5/02438 600/508 |
| 2014/0181741 A1* | 6/2014 | Apacible .............. G06Q 10/109 715/810 |
| 2014/0281956 A1* | 9/2014 | Anderson ............. G06F 3/0482 715/702 |

OTHER PUBLICATIONS

"International Application Serial No. PCT/US2013/073155, International Search Report mailed Sep. 2, 2014", 4 pgs.
"International Application Serial No. PCT/U62013/073155, Written Opinion mailed Sep. 2, 2014", 10 pgs.

* cited by examiner

WEARABLE MAP AND IMAGE DISPLAY

This application is a U.S. National Stage Filing under 35 U.S.C. §371 from International Patent Application Serial No. PCT/US2013/073155, filed on Dec. 4, 2013, the benefit of priority of which is claimed hereby, and is incorporated by reference herein in its entirety.

BACKGROUND

Wrist-based electronic devices (e.g., smart watches) typically have bulky form factors and may be limited to mostly displays. The wrist-based devices that do include a means for inputting data typically use extremely small keypads that may be difficult to activate due to the small size of the buttons.

More recent wrist-based electronic devices have included touch screen input to facilitate entering data and commands. However, these devices may be limited in functionality and some may even be dedicated to a couple functions. For example, global positioning system (GPS) watches may only be used for determining the time and the wearer's location.

There are general needs for greater functionality in a wrist-based electronic device.

DETAILED DESCRIPTION

Typical prior art wearable electronic devices suffer from limited input ability due to button size and/or a limited number of buttons. Embodiments of a wearable electronic device may provide iconic-based user input/output and sensor-based input to enable a user to interact with the electronic device. The electronic device may respond to the user and sensor inputs through visual outputs (e.g., LCD, LED), haptic sensations (e.g., vibrations), and aural inputs and outputs (e.g., voice, sound). This may provide a user with an extended capability to interact with the wearable electronic device beyond a simple keypad or touchscreen only input.

The subsequent discussion refers to a wristband electronic device. However, one skilled in the art will realize that the present embodiments for iconic menus, sensor-based user interaction, and touchscreen-based interaction may be used in other types of electronic devices, wearable or otherwise.

Figure 1:
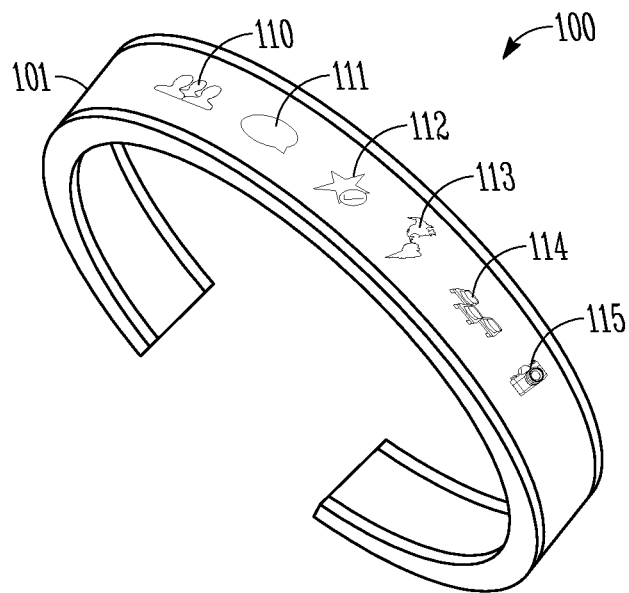
FIG. 1 shows a diagram of an embodiment of a wearable electronic device.

FIG. 1 illustrates a diagram of an embodiment of a wearable electronic device 100. The illustrated embodiment is for a wristband electronic device that includes an annular touch sensitive display (e.g., touchscreen) 101 that displays a number of icons 110-115. The diagram of FIG. 1 is for purposes of illustration only. Other embodiments may use other types of wristbands or other types of wearable electronic devices.

The touch sensitive display 101 may be any type of display having a touch sensitive input. For example, the touch sensitive display 101 may be a liquid crystal display (LCD), an organic light emitting diode display (OLED), a plasma display, electronic ink (e-ink), or some other type of display that may be used as a touch sensitive display.

The following discussion may refer to the display 101 as being an annular display 101. Embodiments of the display 101 may include a display 101 that forms a complete circle or a display 101 that forms only a portion of a circle, as shown in FIG. 1. Each of these embodiments may be included in the definition of an annular display.

The touch sensitive display 101 may use icons 110-115, in combination with the touchscreen capabilities, to enable the user to interact with the electronic device. The icons 110-115 may represent different functions of a menu system of the electronic device. Touching an icon enables a user to select and initiate a function of the electronic device. For example, touching one icon 113 may initiate a mapping function. Touching another icon 115 may initiate an imaging (e.g., camera) function. Both of these functions are described subsequently in greater detail. The electronic device 100 may also have an area of the touch sensitive input that is away from and adjacent to the icons 110-115 so that the user can touch the area while keeping the display visible.

The wearable electronic device 100 may also include sensors that enable the device to sense a variety of things such as ambient conditions (e.g., temperature, humidity, air pressure), movement, and current location of the device. For example, the sensors may include a global positioning system (GPS) receiver and antenna that enables the device to determine its geographical location. A light sensor may provide the device with a capability to adjust its display brightness in response to ambient lighting. An accelerometer and/or solid state gyroscope may enable the device to determine a direction and speed of movement of the user (e.g., movement of the user's arm). A temperature sensor can enable the device to determine an ambient temperature. A barometric sensor can enable the device to determine ambient pressure that may also provide the user with an altitude of the device. A direction sensor may provide a compass function. The device can also connect to other sensors separate and disparate from the body of the device. Other sensors, such as conductance for galvanic skin response, functional near infrared (FNIR) to detect blood circulation, and electro-encephalographic (EEG) data for a head mounted sensor. The listed sensors are for purposes of illustration only. The electronic device 100 may include additional sensor capability.

The wearable electronic device 100 may operate as a stand-alone device, as a companion to another electronic device (e.g., mobile telephone), or as a hub at the center of an ensemble of devices. In the stand-alone mode, the electronic device would be completely self-contained and would rely solely on its own sensory input, in addition to user input, for operation. The electronic device may still have the capability to communicate with other electronic devices and/or systems, but that capability would be disabled in the stand-alone mode.

In the companion mode, the device 100 may include some type of radio transceiver to communicate with other electronic devices and/or systems. The radio transceiver may communicate using different communication standards. For example, in various embodiments, the radio transceiver is capable of transmitting and receiving over a cellular standard (e.g., global system for mobile communications (GSM), time division multiple access (TDMA), code division multiple access (CDMA)), WI-FI™, and/or BLUETOOTH™.

In the hub mode, the device may include two radio transceivers. The first radio transceiver may operate like the one specified in the companion mode, and its main role may be to communicate with other computing devices like cell phones and computers. The second radio transceiver may operate as a central hub for a network of devices. These devices may include a variety of wearable sensors worn on various parts of the body, sensing a variety of inputs. The wearable electronic device 100 may serve as the central data aggregation and processing point for the network.

Figure 2:
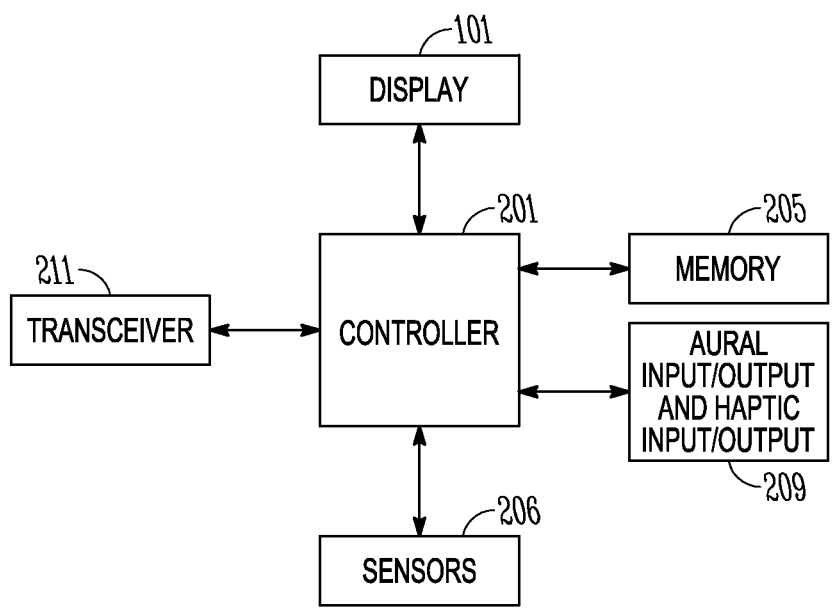
FIG. 2 shows a block diagram of an embodiment of an electronic system in accordance with the wearable electronic device of FIG. 1.

FIG. 2 illustrates a block diagram of an embodiment of an electronic system in accordance with the wearable electronic device 100 of FIG. 1. This block diagram is for purposes of illustration only as other electronic systems may be used to implement the menu system and user interaction capability of the wearable electronic device 100.

The system includes a controller 201 that is responsible for overall control of the electronic system. The controller 201 may include a microprocessor, such as a reduced instruction set computing (RISC) processor, a complex instruction set computing (CSC) processor, dedicated control circuitry, or some other type of control circuitry. The controller 201 may be configured to execute the mapping function and/or the imaging function, as described subsequently.

The system may further include memory 205, coupled to the controller 201, for storage of data. The memory 205 may include read only memory (ROM), non-volatile memory (e.g., flash), random access memory (RAM) such as static RAM (SRAM) and dynamic RAM (DRAM), or other types of memory. The memory 205 may be used to store an operating system, to operate with the subsequently described mapping function and imaging function, temporary operating data generated during device operation, or various operating parameters used by the system in combination with the various sensors and operations.

The display 101 (e.g., touch sensitive display) may be coupled to the controller 201 for inputting data to the system for use by the controller or to be stored in memory 205. The display 101 may also be used by the controller 201 to display the icons and other data generated during system operation.

A sensor module 206 may be coupled to the controller 201 for detecting and generating sensory data used by the controller 201 during system operation. The sensor module 206 may include the sensors as described previously in addition to other types of sensors.

While subsequent examples of embodiments refer to using a GPS sensor to determine the location of the wearable electronic device 100, other embodiments may use other location sensors and other methods to determine a geographical location. For example, triangulation with a plurality of base stations with which the wearable device is communicating may be used to determine the geographical location of the wearable electronic device 100. In such an embodiment, a radio receiver may be considered to be the location sensor.

An aural input/output (I/O) and haptic I/O module 209 may be coupled to the controller 201 for providing sound I/O and vibration sensations. For example, the aural I/O and haptic I/O module 209 may include a speaker for sound generation, a microphone to pick up ambient sounds (e.g. voice), and a vibration generation device to generate haptic sensations (e.g., vibrations) for the user.

A radio transceiver 211 may be coupled to the controller 201 to provide a radio transmission and receiver capability to the electronic system that enables the system to link to other electronic systems. As described previously, the radio transceiver 211 may be used by the electronic system to communicate over one or more various communication standards while in the companion mode.

The controller 201, in combination with the other system elements, may execute software to provide a menu system for the electronic device. The menu system may provide the user with an interaction capability using different touch gestures on the touchscreen display. These gestures may include a horizontal sweep for changing menu depth, a vertical sweep for navigation across the same level of menus, and a "hold and sweep" gesture to enable changing of a single icon/item on a particular menu level. The "hold and sweep" gesture may be accomplished, for example, by touching and holding an assigned spot of the touchscreen (e.g., icon) with a thumb while substantially simultaneously sweeping across the display with a finger.

Figure 3:
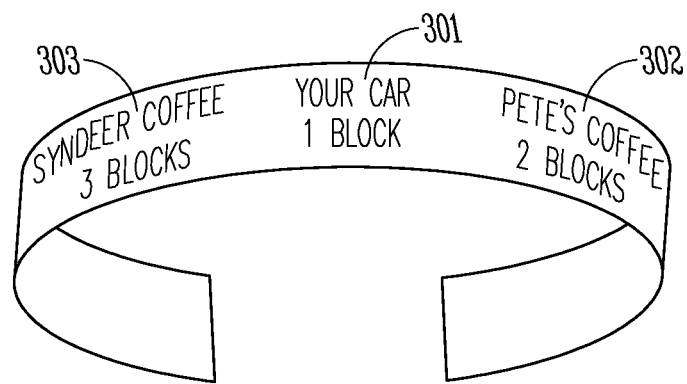
FIG. 3 shows a diagram of an embodiment of a display for the wearable electronic device associated with a mapping function.

FIG. 3 illustrates a display associated with one function of the wearable electronic device 100. The illustrated function may use the GPS and directional (e.g., compass) sensors to provide a mapping function to the user that may show user selectable objects and/or places with their associated relative distance and direction from the user.

The mapping function may be initiated by the user touching the mapping icon 113 on the wearable electronic device 100 as disclosed in FIG. 1. The user may also initiate the mapping function by voice command to the wearable electronic device 100. The user may then hold up the wearable electronic device 100 (e.g., hold up their wrist) to see the results of the mapping query displayed in an annular fashion around the wearable electronic device 100.

As an example of operation, the user may initiate the mapping function by touching the mapping icon 113, hold up their wearable electronic device 100 and use a voice command or touch command to initiate a search and request the display of coffee shops that are near the user's car. The display of FIG. 3 shows a response to the user's query by a block of text 301 indicating that the user's car may be located one block behind the user. Another block of text 302 indicates that the user's favorite coffee shop may be located two blocks to the right of the user. Similarly, a block of text 303 may indicate yet another coffee shop may be located three blocks to the left of the user. Thus, each of the blocks of text 301-303 may be displayed in an annular fashion around the display of the wearable electronic device 100 such that each block of text is displayed in the relative direction that the mapping function search results 301-303 are from the user.

Figure 4:
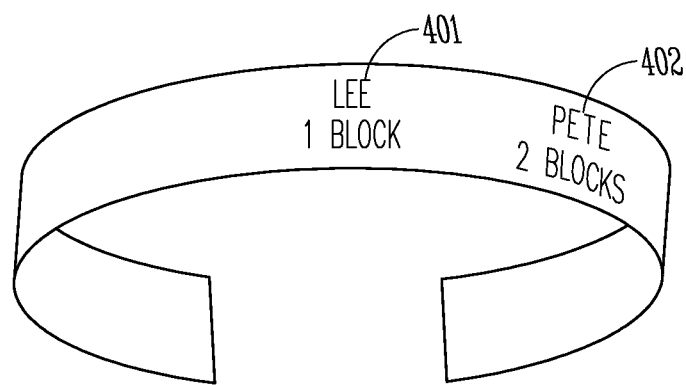
FIG. 4 shows a diagram of another embodiment of a display for the wearable electronic device associated with the mapping function.

FIG. 4 illustrates another display associated with the mapping function of the wearable electronic device 100. As another example of operation, the user may initiate the mapping function as previously discussed and hold up the wearable electronic device 100 and, using a voice or touch command, request the display of friends or colleagues of the user. The wearable electronic device 100 may then display a block of text 401 indicating that one friend is two blocks behind the user and another block of text 402 indicating that another friend is one block to the right of the user.

Such a search may be accomplished by each of the friends having a wearable electronic device 100 or some type of communication device that transmits its geographic location (e.g., GPS coordinates) to the user and/or a central location server. The user's wearable electronic device 100 may then access that server for the location or query the other wearable electronic devices 100 directly using radio communication in order to retrieve the desired geographic locations.

In the above mapping function embodiments, if the user turns their wrist or moves, the displayed text or images may move as well in order to maintain the directions relative to the user. Similarly, as the user moves, the distances may update to indicate the changing relative distances between the user and the mapping function results. This may be accomplished by the wearable electronic device controller 201 accessing the sensors 206 (e.g., gyroscope, accelerometer, direction sensor, GPS) in order to determine the initial orientation of the wearable electronic device 100 prior to movement and subsequent orientation after the start of the movement.

The displayed results of the mapping function are not limited to only text displays. For example, icons and/or images may be used to indicate the mapping function results. Arrows and headings on a compass may also be displayed as the results of the mapping function.

Displayed mapping function results are shown in FIGS. 3 and 4 as being 90° from each other for purposes of illustration only. The mapping function results can be displayed at any location around the wearable electronic device.

Different fonts and textual styles may be used to indicate the relative distance of a mapping function result from the user. For example, a heavier font may be used to indicate a closer result while a very thin font may indicate a more distant result.

Figure 5:
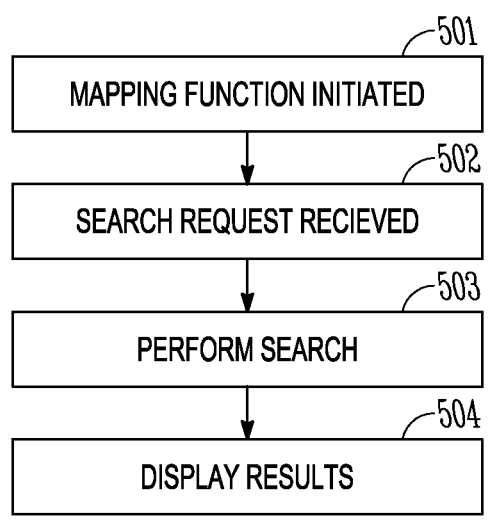
FIG. 5 shows a flowchart of an embodiment of a mapping method that may be executed by the wearable electronic device.

FIG. 5 illustrates a flowchart of an embodiment of a mapping method that can be executed by the wearable electronic device 100. This method is for purposes of illustration only as the wearable electronic device 100 is not limited to any one mapping method.

The mapping function may be initiated 501. This may be accomplished by the wearable electronic device 100 receiving an input from the user such as the user touching a mapping icon, using a voice command, or some other initiation method. The mapping function may also be initiated automatically when the wearable electronic device 100 is in close proximity to a preset geographic location. For example, the user may have preset a particular address into the wearable electronic device 100 at which the wearable electronic device 100 may turn on and perform a search for preset person, object, or business.

If an automatic search request has not already been stored in the wearable electronic device 100, the wearable electronic device 100 may receive a search request 502. This may be accomplished by the user entering a search request. The search request may be in the form of a string of one or more icons, a text input, or a verbal command. For example, the user may touch a coffee shop icon to search all nearby coffee shops or the user may simply verbally instruct the wearable electronic device 100 to display all nearby coffee shops.

The wearable electronic device 100 may perform a search in response to the search request 503 such as performed by a World Wide Web search engine (e.g., GOOGLE). For example, if the user had input a search request for nearby coffee shops, a search of a database (e.g., geographical map database) containing businesses with their function and geographic locations may be performed. This database may be a database stored in the wearable electronic device 100 or may be accessed over a radio channel by accessing a server. The database search may use the user's geographical location to narrow the search to only local business establishments. If the user had input a search request for nearby friends, a location services server having updated locations of people may be accessed. In another embodiment, the wearable electronic device 100 may transmit a query over a radio channel for particular people requested by the user. The wearable electronic device 100 may then wait a predetermined time for a reply from those users that are within communication range of the user initiating the request. The response may be in the form of an automatic reply from the queried friend's communication devices (e.g., wearable electronic devices).

The wearable electronic device may now display the results of the search 504. This may be accomplished by the user holding the wearable electronic device in a particular orientation in order to view the results on the display of the wearable electronic device 100. For example, the user may hold their wrist substantially vertically in front of them in order to view the display.

Figure 6A:
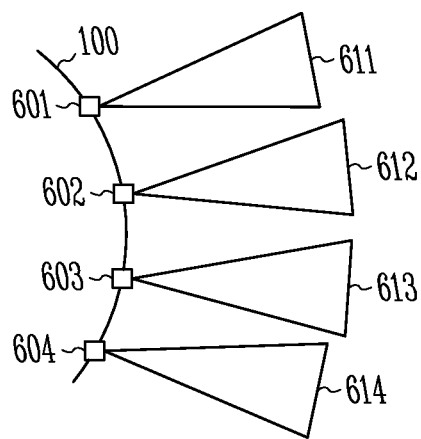
FIGS. 6A and 6B show diagrams of embodiments of image sensors for an imaging function in accordance with the wearable electronic device of FIGS. 1 and 2.
Figure 6B:
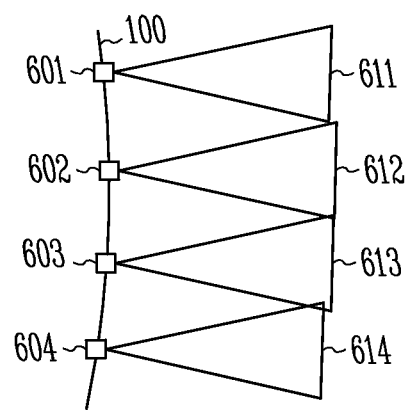
Figure 7:
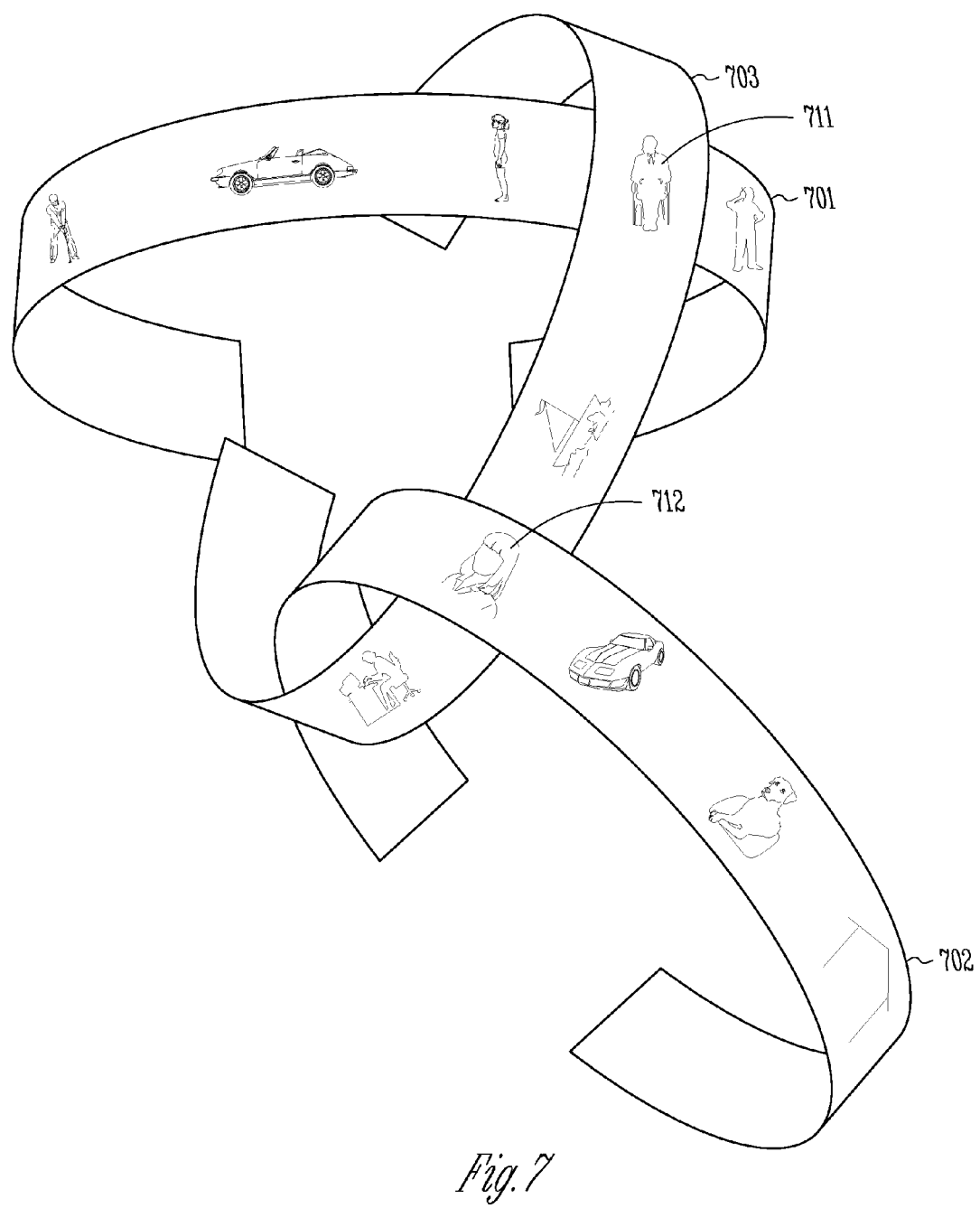
FIG. 7 shows a diagram of an embodiment of displays for the wearable electronic device associated with the imaging function.

FIGS. 6A, 6B, and 7 illustrate an imaging function that may be implemented by the wearable electronic device 100. The wearable electronic device 100 may include a plurality of image sensors 601-604 that may be located in an annular fashion around the edges or the surface of the wearable electronic device 100.

Figure 8:
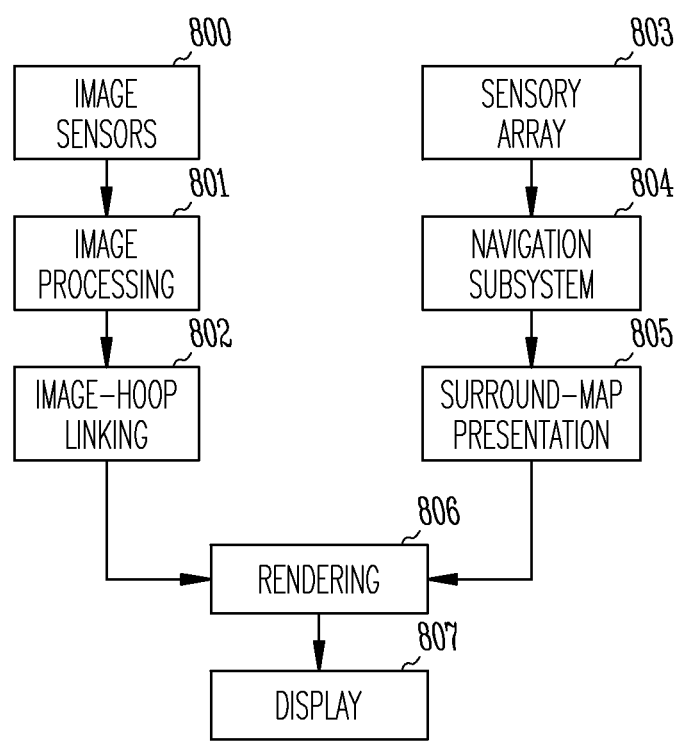
FIG. 8 shows a block diagram of an embodiment of a system in accordance with the imaging function.

The image sensors 601-604 may capture images that may be displayed on the wearable electronic device 100 as "image hoops" 701-703. These "image hoops" 701-703 (e.g., annular images) may be shared with other wearable electronic device users 100 through the above described radio link. The "image hoops" may comprise a substantially 360° image that is a result of the combination (e.g., stitching together) of the images captured by the image sensors 601-604. To generate the "image hoops" 701-703, the wearable electronic device 100 may use data from the GPS sensor and the directional sensor (e.g., compass), as illustrated in FIG. 8, in order to generate the resulting "image hoop" 701-703.

The "image hoops" 701-703 may be linked together in an image viewer (e.g., browser) as shown in FIG. 7. An image rendering module 806 (e.g., software and/or hardware), as illustrated in FIG. 8, may analyze the images in each of the "image hoops" 701-703 and link those "image hoops" 701-703 that have the same person or object 711, 712 in each "image hoop" 701-703 (e.g., substantially similar subject or image). Alternatively, two wearers of such devices, who capture image hoops within the vicinity of each other, may have linked image hoops as a result of the system recognizing the identity and/or location of the fellow wearer, as well as one or more matched portions of imagery.

The imaging function may also adjust a resulting image in response to the resulting size of an arc formed by a user wearing the wearable electronic device 100. For example, the orientation of the image visual fields 611-614 illustrated in FIG. 6A may result from a user having a smaller wrist size than the same image visual fields 611-614 that may result from another user having a larger wrist size. It can be seen that the visual fields 611-614 of FIG. 6A are separated more than those of FIG. 6B.

The imaging function may increase or decrease the overlap of the imaging fields 611-614 in order to attempt to maintain approximately the same image results even when different sizes of user's wrists. For example, the imaging function may remove rows of pixels of an image if the visual fields 611-614 overlapped too much.

The imaging function may also add rows of pixels to an image if the visual fields 611-614 do not overlap enough, as illustrated in FIG. 6A. This may be accomplished by averaging the edges of adjacent images that have been generated by adjacent image sensors 601-604. Substantially similar image pixels can then be added between the adjacent images when the "image hoop" is created. Increasing and decreasing the sizes of the individual images effectively changes the size of the field of view of each sensor.

FIG. 8 illustrates a block diagram of an embodiment of a system that may execute the imaging function and generate an "image hoop" and/or linked "image hoops". This system may be implemented in software, hardware, or a combination of software and hardware. The block diagram of FIG. 8 is for purposes of illustration only as the imaging function may be implemented in various other ways.

The system may include the image sensors 800 for capturing the plurality of individual images to be combined into the "image hoop". The image sensors 800 may be located in an annular fashion around the wearable electronic device 100.

An image processing module 801 may provide the capability for editing the images received from the image sensors 800. The image processing module 801 may adjust the size of the field of views for each image sensor by adding or subtracting rows of pixels as described previously. The image processing module 801 may also include the capability of adjusting the exposure of each image in order to attempt to make the exposure for the entire "image hoop" more consistent through-out the entire "image hoop".

An "image hoop" linking module 802 may provide the actual combining (e.g., stitching together edges) of the images from the image processing module 801. This module may link up the edges of adjacent images in order to form the "hoop". The "image hoop" linking module 802 may also provide the image analysis to determine if any images in a plurality of "image hoops" are of the same object/person. This information can be passed on to the rendering module 806 for use in generating the final image, as subsequently described.

A sensor array 803 may include the location, accelerometer, gyroscope, directional sensor, and/or any other sensor that may be used to determine the orientation/location of the wearable electronic device. For example, a GPS receiver may be used to determine an actual location of the wearable electronic device 100 while the accelerometer, gyroscope, and directional sensor may be used to determine which direction the various image sensor are presently pointing and which direction the sensors are moving.

A navigation system 804 may provide mapping capabilities that may locate, via inputs from the sensor array 803 (e.g., GPS), a location of a user wearing the electronic device 100 with reference to a geographical map. The navigation system 804 may also provide distance to locations on the geographical map.

A surround-map presentation module 805 may take the output from the navigation system 804 and organize it such that the user wearing the electronic device 100 may be centrally to the plurality of images such that all distances and locations are determined relative to the user. Thus, all distances to locations of interest in their respective positions on the "image hoop" are determined with respect to the user wearing the electronic device 100.

A rendering module 806 may take the outputs of the surround-map presentation module 805 and the "image hoop" linking module 802 and generates the "image hoop" for display on the wearable electronic device display 807. Multiple linked "image hoops" may be linked and displayed in a viewer (e.g., browser).

Figure 9:
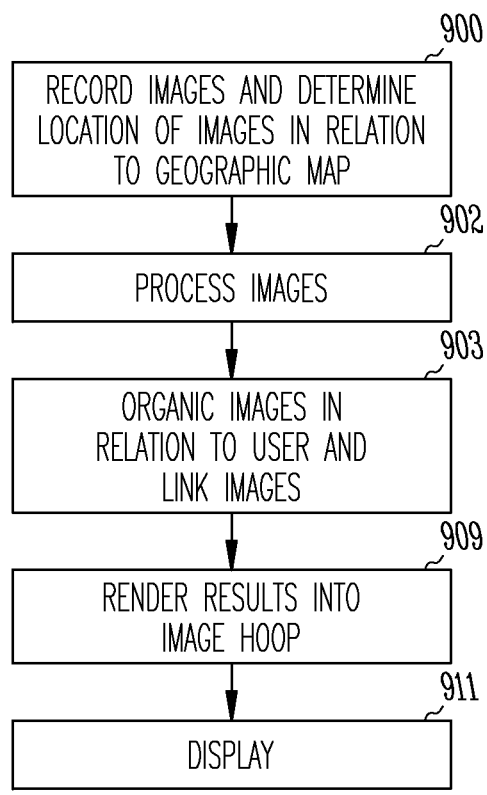
FIG. 9 shows a flowchart of an embodiment of an imaging method that may be executed by the wearable electronic device.

FIG. 9 illustrates a flowchart of an embodiment of a method for an imaging function that may be executed by the wearable electronic device 100. This method is for purposes of illustration only as the wearable electronic device 100 is not limited to any one imaging function or one method of performing that imaging function.

The images from the image sensors of the wearable electronic device may be recorded and a location of each image determined in relation to a geographic map 900. The images may be processed 901. The processing may include adjusting the size of the field of views for each image sensor by adding pixels to or subtracting pixels from the images. The images may then be organized in relation to the user and linked by attaching together the edges of adjacent images 903. The resulting images may then be rendered into an "image hoop" 909 as discussed previously and displayed 911 on the display of the wearable electronic device 100.

Figure 10:
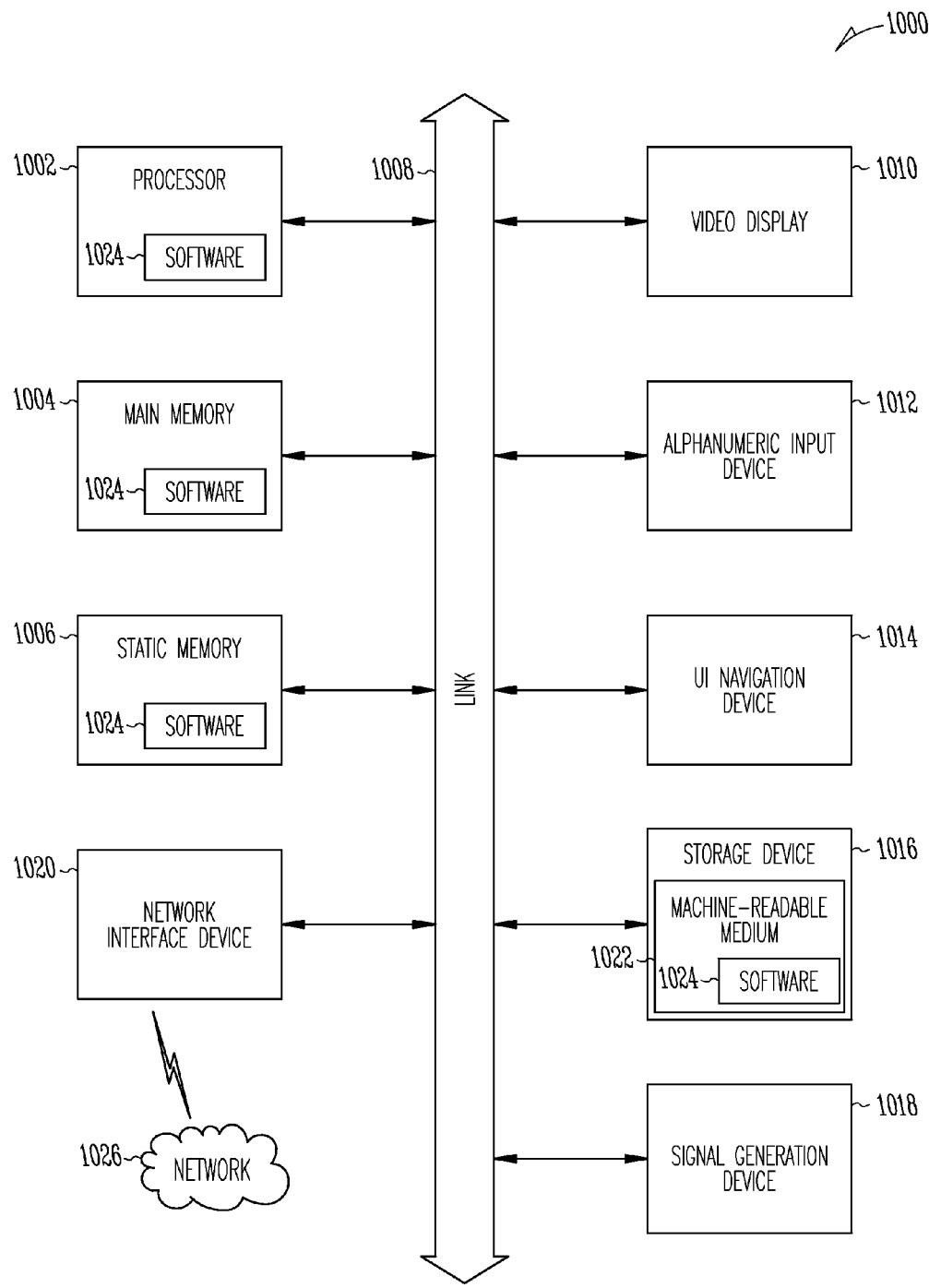
FIG. 10 shows a block diagram of an embodiment of a computer system in accordance with the wearable electronic device of FIG. 1.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable electronic device 100, an onboard vehicle system, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples

The following examples pertain to further embodiments.

Example 1 is a wearable electronic device comprising: an annular display, a plurality of sensors including a plurality of image sensors, a location sensor, and a direction sensor, wherein the plurality of image sensors are located in an annular fashion around the touchscreen display; and a controller coupled to the annular display and the plurality of sensors, the controller to execute mapping and imaging functions to generate an annular image on the annular display of search results and a plurality of images, wherein the search results and the plurality of images are displayed relative to a direction of a user of the wearable electronic device.

In Example 2, the subject matter of Example 1 can optionally include wherein the controller is to receive a search request, generate search results in response to the search request, each search result having a geographical location in relation to the user, and display the search results in an annular fashion on the annular display in response to a geographical location of the user and the geographical location of each search result.

In Example 3, the subject matter of Examples 1-2 can optionally include wherein the controller is to generate the plurality of images, determine a relative geographical location of each image with respect to the user, and display the plurality of images as an annular image on the annular display wherein each image is displayed according to its relative location with the user.

In Example 4, the subject matter of Examples 1-3 can optionally include wherein the controller is to adjust a visual field of each image of the plurality of images responsive to a size of arc formed by the annular touchscreen display.

In Example 5, the subject matter of Examples 1-4 can optionally include wherein the controller is to adjust an exposure of the plurality of images such that the annular image comprises a substantially consistent exposure.

In Example 6, the subject matter of Examples 1-5 can optionally include a navigation subsystem coupled to the location sensor and the direction sensor and configured to generate mapping capabilities; a surround-map presentation module coupled to the navigation subsystem and configured to organize the plurality of images such that the user is located centrally to the plurality of images; and a rendering module coupled to the image sensors and the surround-map presentation module and configured to generate an annular image from the plurality of images.

In Example 7, the subject matter of Examples 1-6 can optionally include 1 wherein the location sensor is a global positioning satellite receiver.

In Example 8, the subject matter of Examples 1-7 can optionally include wherein the location sensor is a radio receiver for triangulating between a plurality of base stations.

In Example 9, the subject matter of Examples 1-8 can optionally include wherein the controller is to add or subtract pixels from the plurality of images to adjust a visual field.

Example 10 is a method for generating a map display on a wearable electronic device, the method comprising: receiving a search request; performing a geographical search in response to the search request to generate search results; and displaying the search results on a display of the wearable electronic device such that each search result is displayed in an annular fashion around the wearable electronic device relative to a user and a geographical location of the search result.

In Example 11, the subject matter of Example 10 can optionally include wherein the search request is a stored search request, the method further comprising initiating the geographical search in response to a geographical location of the user and the stored search request.

In Example 12, the subject matter of Examples 10-11 can optionally include updating a location of each search result on the display in response to movement of the user.

In Example 13, the subject matter of Examples 10-12 can optionally include wherein displaying the search results on the display comprises displaying an icon representative of the search results.

In Example 14, the subject matter of Examples 10-13 can optionally include wherein displaying the search results on the display comprises displaying a block of text for each search result wherein each block of text includes a relative distance from the user.

In Example 15, the subject matter of Examples 10-14 can optionally include wherein displaying the block of text comprises displaying a block of text wherein a font for the block of text changes in response to a relative distance of the search result, represented by the block of text, from the user.

In Example 16, the subject matter of Examples 10-15 can optionally include wherein displaying the search results on the display comprises displaying an icon representative of each search result.

In Example 17, the subject matter of Examples 10-16 can optionally include wherein performing the geographical search comprises accessing a geographical database over a radio channel.

Example 18 is a machine-readable medium comprising instructions for generating geographically related search results on a map display of a wearable electronic device, which when executed by a machine, cause the machine to perform any one of the methods of Examples 10-17.

Example 19 is a method for generating an image on a wearable electronic device, the method comprising: generating a plurality of images from a plurality of image sensors located in an annular fashion around the wearable electronic device; determining a geographical location for each of the images in relation to a user of the wearable electronic device; linking the plurality of images in relation to the user of the wearable electronic device and the geographical location for each image to generate an annular image; and displaying the annular image, on a display of the wearable electronic device, in relation to the user of the wearable electronic device and the geographical location for each image in the annular image.

In Example 20, the subject matter of Example 19 can optionally include adjusting a visual field of each of the plurality of image sensors in response to a size of an arc formed by the user wearing the wearable electronic device.

In Example 21, the subject matter of Examples 19-20 can optionally include wherein adjusting the visual field of each of the plurality of image sensors comprises adding or subtracting pixels to the plurality of images to increase or decrease, respectively, the size of the visual field.

In Example 22, the subject matter of Examples 19-21 can optionally include wherein linking the plurality of images in relation to the user of the wearable electronic device comprises combining edges of adjacent images in the annular fashion.

In Example 23, the subject matter of Examples 19-22 can optionally include analyzing each of the plurality of images to determine images having a substantially similar subject.

In Example 24, the subject matter of Examples 19-23 can optionally include generating an image of a plurality of annular images that are linked together by the substantially similar subject.

Example 25 is an apparatus to generate an image on a wearable electronic device, comprising means for performing one of the examples 19-24.

Example 26 is a method for generating a display on a wearable electronic device, the method comprising: determining a geographical location of each image of a plurality of images or each search result of plurality of search results in relation to a user of the wearable electronic device; and displaying an annular display of the plurality of images or the plurality of search results wherein the plurality of search results or the plurality of images are displayed in response to geographical locations represented by the plurality of search results or the plurality of images relative to a user of the wearable electronic device.

In Example 27, the subject matter of Example 26 can optionally include determining the geographical locations in response to a geographical map database.

In Example 28, the subject matter of Examples 26-27 can optionally include accessing the geographical map database over a radio channel.

Example 29 is an apparatus for displaying a plurality of geographically referenced search results, comprising: means for receiving a search request; means for performing a geographical search in response to the search request to generate the search results; and means for displaying the search results on a display of the wearable electronic device such that each search result is displayed in an annular fashion around the apparatus relative to a user and a geographical location of the search result.

In Example 30, the subject matter of Example 29 can optionally include g means for determining a geographical location of the apparatus.

Example 31 is an apparatus for displaying a plurality of geographically referenced images, comprising: means for generating a plurality of images from a plurality of image sensors located in an annular fashion around the wearable electronic device; means for determining a geographical location for each of the images in relation to a user of the wearable electronic device; means for linking the plurality of images in relation to the user of the wearable electronic device and the geographical location for each image to generate an annular image; and means for displaying the annular image, on a display of the wearable electronic device, in relation to the user of the wearable electronic device and the geographical location for each image in the annular image.

In Example 32, the subject matter of Example 31 can optionally include means for linking the plurality of images comprises means for adding or removing pixels of the plurality of images such that edges of adjacent images are joined.

Example 33 is a machine-readable medium comprising instructions for generating geographically related search results on a map display of a wearable electronic device, which when executed by a machine, cause the machine to: determine a geographical location of each image of a plurality of images or each search result of plurality of search results in relation to a user of the wearable electronic device; and display an annular display of the plurality of images or the plurality of search results on the wearable electronic device wherein the plurality of search results or the plurality of images are displayed in response to geographical locations represented by the plurality of search results or the plurality of images relative to a user of the wearable electronic device.

In Example 34, the subject matter of Example 33 can optionally include wherein the machine is further caused to add or subtract pixels from adjacent images such that the plurality of images are linked in an annular fashion.

In Example 35, the subject matter of Examples 33-34 can optionally include wherein the machine is further caused to update a location of each search result on the display in response to movement of the user.

In Example 36, the subject matter of Examples 33-35 can optionally include wherein the machine is further caused to display an icon representative of the search results.

In Example 37, the subject matter of Examples 33-36 can optionally include wherein the machine is further caused to display a block of text for each search result wherein each block of text includes a relative distance from the user.

In Example 38, the subject matter of Examples 33-37 can optionally include wherein the machine is further caused to display a block of text wherein a font for the block of text changes in response to a relative distance of the search result, represented by the block of text, from the user.

In Example 39, the subject matter of Examples 33-38 can optionally include wherein the machine is further caused to display an icon representative of each search result.

In Example 40, the subject matter of Examples 33-39 can optionally include wherein the machine is further caused to access a geographical database over a radio channel.

Example 41 is a machine-readable medium comprising instructions for generating geographically related search results on a map display of a wearable electronic device, which when executed by a machine, cause the machine to: receive a plurality of annular images; analyze the plurality of annular images to determine images having a substantially similar subject; and display an image of at least two of the plurality of annular images that are linked by the substantially similar subject.

In Example 42, the subject matter of Example 41 can optionally include wherein the machine is further caused to receive the plurality of annular images from a plurality of wearable electronic devices.

Example 43 is a wearable electronic device comprising: means for determining a geographical location of each image of a plurality of images or each search result of plurality of search results in relation to a user of the wearable electronic device; and means for displaying an annular display of the plurality of images or the plurality of search results wherein the plurality of search results or the plurality of images are displayed in response to geographical locations represented by the plurality of search results or the plurality of images relative to a user of the wearable electronic device.

In Example 44, the subject matter of Example 43 can optionally include means for determining the geographical locations in response to a geographical map database.

In Example 45, the subject matter of Examples 43-44 can optionally include means for accessing the geographical map database over a radio channel.

What is claimed is:

1. A wearable electronic device comprising:
an annular touch sensitive display:
a plurality of sensors including a plurality of image sensors, a location sensor, and a direction sensor, wherein the plurality of image sensors are located in an annular fashion around the annular touch sensitive a touchscreen display; and
a controller coupled to the annular touch sensitive display and the plurality of sensors, the controller to turn on, automatically, the device and execute mapping and imaging functions in response to proximity of the device to a predetermined geographical location stored in the device and to generate an annular image on the annular touch sensitive display that comprises search results and/or a plurality of images, wherein the search results and the plurality of images are displayed relative to a direction of a user of the wearable electronic device.

2. The wearable electronic device of claim 1 wherein the controller is to receive a search request, generate search results in response to the search request, each search result having a geographical location in relation to the user, and display the search results in an annular fashion on the annular touch sensitive display in response to a geographical location of the user and the geographical location of each search result.

3. The wearable electronic device of claim 1 wherein the controller is to generate the plurality of images, determine a relative geographical location of each image with respect to the user, and display the plurality of images as an annular image on the touch sensitive annular display wherein each image is displayed according to its relative location with the user.

4. The wearable electronic device of claim 3 wherein the controller is to adjust a visual field of each image of the plurality of images responsive to a size of arc formed by the annular touch sensitive display.

5. The wearable electronic device of claim 3 wherein the controller is to adjust an exposure of the plurality of images such that the annular image comprises a substantially consistent exposure.

6. The wearable electronic device of claim 1 further comprising:
a navigation subsystem coupled to the location sensor and the direction sensor and configured to generate mapping capabilities;
a surround-map presentation block coupled to the navigation subsystem and configured to organize the plurality of images such that the user is located centrally to the plurality of images; and
a rendering block coupled to the image sensors and the surround-map presentation block and configured to generate an annular image from the plurality of images.

7. The wearable electronic device of claim 1 wherein the location sensor is a global positioning satellite receiver.

8. The wearable electronic device of claim 1 wherein the location sensor is a radio receiver for triangulating between a plurality of base stations.

9. The wearable electronic device of claim 1 wherein the controller is to add or subtract pixels from the plurality of images to adjust a visual field.

10. A method for generating a display on a wearable electronic device, the method comprising:
turning on, automatically, the wearable electronic device in response to a proximity of the device to a predetermined geographical location stored in the device;
determining a geographical location of each image of a plurality of images or each search result of a plurality of search results in relation to a user of the wearable electronic device in response to the proximity of the device to the predetermined geographical location stored in the device; and
displaying an annular display of the plurality of images or the plurality of search results wherein the plurality of search results or the plurality of images are displayed in response to geographical locations represented by the plurality of search results or the plurality of images relative to a user of the wearable electronic device.

11. The method of claim 10 further comprising determining the geographical locations in response to a geographical map database.

12. The method of claim 11 further comprising accessing the geographical map database over a radio channel.

13. A non-transitory machine-readable medium comprising instructions for generating geographically related search results on a map display of a wearable electronic device, which when executed by a machine, cause the machine to:
   turn on, automatically, the wearable electronic device in response to a proximity of the device to a predetermined geographical location stored in the device;
   determine a geographical location of each image of a plurality of images or each search result of a plurality of search results in relation to a user of the wearable electronic device in response to the proximity of the device to the predetermined geographical location stored in the device: and
   display an annular display of the plurality of images or the plurality of search results on the wearable electronic device wherein the plurality of search results or the plurality of images are displayed in response to geographical locations represented by the plurality of search results or the plurality of images relative to a user of the wearable electronic device.

14. A non-transitory machine-readable medium of claim 13 wherein the machine is further caused to add or subtract pixels from adjacent images such that the plurality of images are linked in an annular fashion.

15. A non-transitory machine-readable medium of claim 13 wherein the machine is further caused to update a location of each search result on the display in response to movement of the user.

16. A non-transitory machine-readable medium of claim 13 wherein the machine is further caused to display an icon representative of the search results.

17. A non-transitory machine-readable medium of claim 13 wherein the machine is further caused to display a block of text for each search result wherein each block of text includes a relative distance from the user.

18. A non-transitory machine-readable medium of claim 13 wherein the machine is further caused to display a block of text wherein a font for the block of text changes in response to a relative distance of the search result, represented by the block of text, from the user.

19. A non-transitory machine-readable medium of claim 13 wherein the machine is further caused to display an icon representative of each search result.

20. A non-transitory machine-readable medium of claim 13 wherein the machine is further caused to access a geographical database over a radio channel.

21. A wearable electronic device comprising:
   means for turning on, automatically, the wearable electronic device in response to a proximity of the device to a predetermined geographical location stored in the device;
   means for determining a geographical location of each image of a plurality of images or each search result of a plurality of search results in relation to a user of the wearable electronic device in response to the proximity of the device to the predetermined geographical location stored in the device; and
   means for displaying an annular display of the plurality of images or the plurality of search results wherein the plurality of search results or the plurality of images are displayed in response to geographical locations represented by the plurality of search results or the plurality of images relative to a user of the wearable electronic device.

22. The wearable electronic device of claim 21 further comprising means for determining the geographical locations in response to a geographical map database.

23. The wearable electronic device of claim 22 further comprising means for accessing the geographical map database over a radio channel.

* * * * *